United States Patent [19]

Miskic

[11] 4,074,412
[45] Feb. 21, 1978

[54] METHOD OF REPAIRING OR REINFORCING TUBULAR PLASTIC MEMBERS

[76] Inventor: Franjo Miskic, Gajeva UL. 23, Hrvatska, 41000-Zagreb, Yugoslavia

[21] Appl. No.: 729,455

[22] Filed: Oct. 4, 1976

[30] Foreign Application Priority Data

Oct. 8, 1975  Yugoslavia ............... 2568/75

[51] Int. Cl.² ............... B23P 7/00
[52] U.S. Cl. ............... 29/401 E; 29/447; 264/251; 264/36
[58] Field of Search ............ 29/401 D, 401 E, 401 B, 29/401 R, 402, 447; 264/36, 251

[56] References Cited

U.S. PATENT DOCUMENTS

| 2,739,829 | 3/1956 | Pedlow et al. | 29/447 |
| 3,243,211 | 3/1966 | Wetmore | 29/447 |
| 3,360,846 | 1/1968 | Schellstede et al. | 29/447 |
| 3,372,462 | 3/1968 | Reid et al. | 29/447 |
| 3,962,767 | 6/1976 | Byerley et al. | 29/157.3 C |

Primary Examiner—C.W. Lanham
Assistant Examiner—V. Rising
Attorney, Agent, or Firm—Rogers, Bereskin & Parr

[57] ABSTRACT

A method of repairing or reinforcing a tubular plastic member is described. According to the method, a metal sleeve is applied to the plastic member under the action of heat. The sleeve is of a shape and size selected to closely fit and make surface-to-surface contact with the member at the region thereof to be repaired or reinforced. The sleeve is heated to a temperature sufficient to cause melting of the surface of the member where it contacts the metal sleeve. Subsequently, the plastic member and sleeve are abruptly cooled.

3 Claims, 11 Drawing Figures

METHOD OF REPAIRING OR REINFORCING TUBULAR PLASTIC MEMBERS

This invention relates to a method of repairing or reinforcing tubular members made of plastic materials.

Tubular plastic members are commonly used in many environments. For example, such members are often used as conduits for liquids, as in the case of a plastic pipe connector or a plastic sewer pipe or downspout. Another example of the use of a tubular plastic member is in a plastic control knob for a seclector switch, in which the knob includes an integral tubular member arranged to be turnably coupled with the operating spindle of the switch.

While the use of tubular members made of plastic materials has many advantages, for example, in terms of ease of manufacture and cost, a disadvantage is that such members are susceptible to damage in use and that, when damaged, they are not easily repairable. Referring to the examples quoted above, a plastic pipe connector on, say, a domestic lawn sprinkler may include a tubular plastic member which is integral with the main housing of the sprinkler, and which has at its outer end a projecting annular lip for retaining a captive nut for use in coupling a hose pipe to the sprinkler. The tubular plastic member normally projects outwardly from the housing of the sprinkler, and is therefore particularly susceptible to damage; in fact, it is found in practice that the lip often breaks off the tubular plastic member. In this event, it has not previously been possible to repair the sprinkler. At the very least, the entire housing, together with its integral tubular plastic member has had to be replaced.

In the case of a plastic selector switch control knob, the integral tubular plastic member of the knob commonly breaks due to the forces imposed on the member when the switch is operated. Prior to the present invention, it was not possible to economically repair the member after breakage. Similarly, in the case of a damaged plastic sewer pipe or downspout, economic repair has not been possible and it has been necessary to replace an entire section of damaged pipe. This involves exposing the entire length of the section. In the case of enclosed or buried pipes, considerable work may be necessary to expose the damaged section and to make good the enclosure after the section has been replaced.

An object of the present invention is to provide a method of repairing or reinforcing tubular plastic members.

According to the invention, the method comprises the steps of:

applying to the member under the action of heat, a metal sleeve which is of a shape and size selected to closely fit and make surface-to-surface contact with the tubular plastic member at the region thereof to be repaired or reinforced, and which is heated to a temperature sufficient to cause melting of the surface of the member where it contacts the metal sleeve; and, abruptly cooling the plastic member and sleeve.

Reference will now be made to the accompanying drawings in describing a number of embodiments of the invention by way of example. In the drawings.

Figure 1:
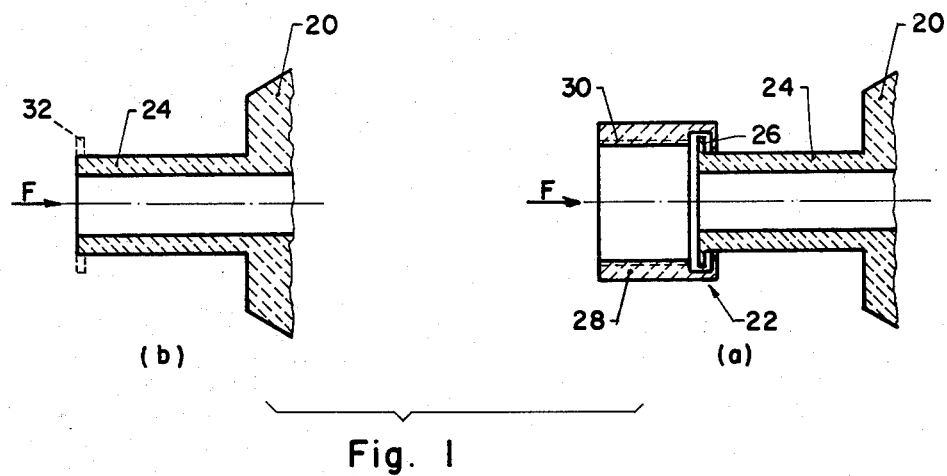
FIGS. 1a and 1b are longitudinal sectional views through a conventional plastic pipe connector, the connector being shown in its normal condition of use in FIG. 1a and in its broken, unrepaired condition in FIG. 1b.

Reference will first be made to FIGS. 1a and 1b in describing a conventional plastic pipe connector. The connector shown in these views is of the type used, for example, on domestic lawn sprinklers. Part of the main housing of the sprinkler is indicated at 20 and the connector is generally denoted 22. The connector includes a tubular plastic member 24 which is moulded integrally with the housing 20 and which projects outwardly therefrom. Member 24 is of circular shape in cross-section and has an outwardly projecting circular lip 26 at its outer end. Lip 26 serves to retain a captive nut 28 which is turnable with respect to the lip. Nut 28 has internal screw threads 30 for coupling a hose pipe to the connector.

It will be appreciated that the lip 26 of the connector is susceptible to damage when the sprinkler is in use, particularly in view of the extensive manipulation of nut 28 which is required when connecting or disconnecting a hose pipe. As a result, it is found that the lip 26 often breaks off the member 24. FIG. 1b shows the connector in this condition with the broken-off lip indicated in dotted lines at 32.

Figures 2, 3:
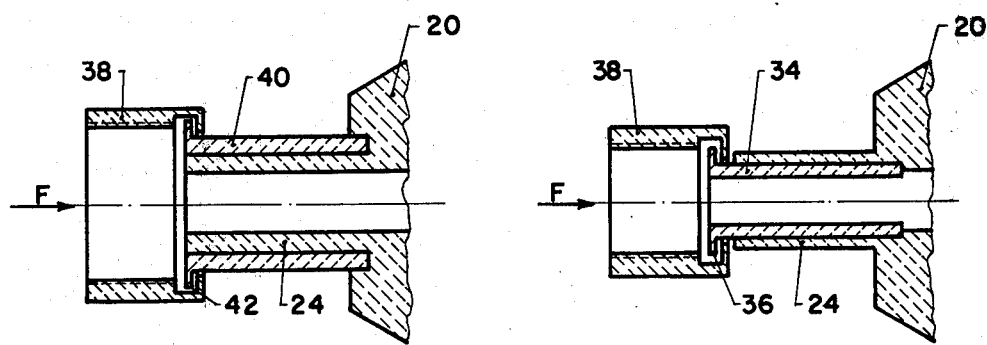
FIG. 2 is a view similar to FIG. 1a and illustrates one way of repairing the broken plastic pipe connector of FIG. 1b.
FIG. 3 is a view similar to FIG. 2 showing an alternative way of repairing the pipe connector.

FIGS. 2 and 3 show the tubular plastic member of the sprinkler in its broken condition (as in FIG. 1b) and illustrate two ways in which the member may be repaired in accordance with the method of the invention. In both cases, a metal sleeve is applied to the tubular plastic member under the action of heat and has at its outer end a lip which retains a captive nut in a fashion similar to that illustrated in FIG. 1a. The embodiments of FIGS. 2 and 3 differ in that the metal sleeve is applied to the inner surface of the tubular plastic member in FIG. 2 and to the outer surface of the member in FIG. 3. Accordingly, in FIG. 2, the sleeve in effect reduces the internal diameter of the tubular plastic member and hence the flow capability of the member. In contrast, when the sleeve is applied to the outer surface of the member as in FIG. 3, the internal diameter and hence the flow capability of the tubular plastic member remains the same.

In FIG. 2, the metal sleeve is indicated at 34 and has at its outer end a projecting lip 36 which retains a captive nut 38. In FIG. 3 on the other hand, the metal sleeve is indicated at 40 and has at its outer end a lip denoted 42 which retains a captive nut 44.

In both embodiments, the metal sleeve is applied to the tubular plastic member as follows. The sleeve 34 or 40 as the case may be is heated to a red hot state and is quickly applied to the tubular plastic member, being inserted inside the member in the FIG. 2 embodiment and outside the member in the FIG. 3 embodiment. As soon as the sleeve is in position, the plastic member and sleeve are abruptly cooled in water. The temperature of the metal sleeve is such that the surface of the tubular plastic member is melted where it contacts the metal sleeve, forming a secure joint with the sleeve when the assembly is cooled. Due to the abrupt cooling, deformation of the plastic member is avoided or at least minimized. For this reason, it is desirable that the metal sleeve be applied to the plastic member as quickly as possible. Nevertheless, it is recommended that the interior of the tubular plastic member 24 be inspected, particularly in the FIG. 3 embodiment to make sure that the flow capability of the pipe connector has not been impaired.

In each of FIGS. 1a, 1b 2 and 3, the direction of water flow into the connector is indicated by an arrow F.

It will be appreciated that the operation of repairing the tubular plastic member may readily be performed without the need for special tools. In fact, the operation may be successfully performed using only a pair of pliers to hold the metal sleeve, a heat source and water for cooling. Similarly, the materials required are very simple — merely a metal sleeve with a lip at one end, and a captive nut fitted to the sleeve. By way of illustration of the simplicity of the repair operation, it has been found that one trained worker using simple tools can repair one hundred and forty items such as lawn sprinklers with broken tubular plastic members during seven hours of effective daily work, or twenty items per hour. In one specific instance, it has, for example, been estimated that the cost of repairing an item is approximately $1.70. This compares with a replacement cost of between $8.00 and $275.00 depending on the specific item in question.

Figure 4:
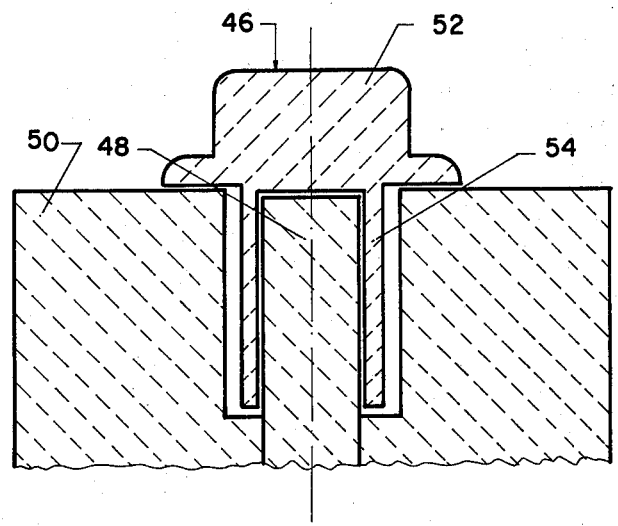
FIG. 4 is a longitudinal sectional view through a conventional selector switch control knob fitted to the operating spindle of a selector switch.

FIG. 4 shows a control knob generally denoted 46 for a selector switch (not shown) in a television receiver. Although the invention will be described primarily with reference to a selector switch in a television receiver, it is to be understood that there is, of course, no limitation in this and that the invention could be used to repair or reinforce a selector switch in any type of equipment. In any event, the operating spindle for the selector switch is visible at 48 in FIG. 4. Part of the cabinet of the television receiver is indicated at 50. The control knob 46 includes an external portion 52 which is designed to be turned manually and a tubular plastic member 54 which is integral with portion 52 and which projects to the interior of the receiver through an opening in the casing. The operating spindle 48 of the selector switch projects into the interior of the tubular plastic member 54 and is coupled to the member as will be described so that, if the outer portion 52 of the control knob 46 is turned manually, spindle 48 is also turned by way of the member 54.

The arrangement shown in FIG. 4 is conventional. In practice, it is found that the tubular plastic member 54 tends to crack or even break off due to the forces imposed thereon when the selector switch is operated. Prior to this invention, it has not been possible to repair broken control knobs. The entire knob has had to be discarded and replaced in its entirety.

Figure 5:
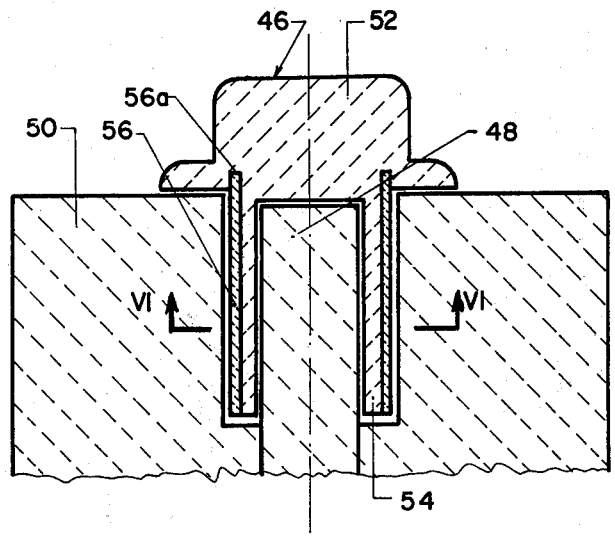
FIG. 5 is a view similar to FIG. 4 showing the control knob reinforced in accordance with the method of the invention.
Figure 6:
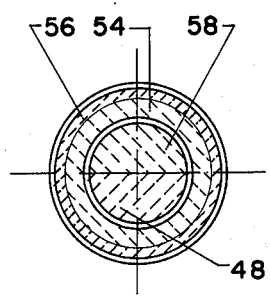
FIG. 6 is a transverse sectional view on line VI—VI of FIG. 5.
Figure 7:
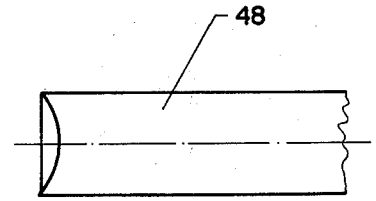
FIG. 7 shows the operating spindle of the selector switch.

FIGS. 5 to 7 illustrate how a control knob of the kind shown in FIG. 4 may be reinforced to prevent the tubular plastic member cracking in use, or may be repaired after it has cracked. A metal sleeve generally denoted 56 is applied to the tubular plastic member 54 of the control knob under the action of heat. Sleeve 56 is selected to closely fit over the member 54 in surface-to-surface contact therewith. With the control knob removed from the television receiver, the metal sleeve 56 is heated to a red hot state and slid over the external surface of the tubular plastic member 54 as described in connection with the preceding embodiments. The sleeve and plastic member are then abruptly cooled by water, which results in the formation of a firm joint between the sleeve 56 and the tubular plastic member 54. As can be seen, the forward end 56a of the sleeve also penetrates the outer portion 52 of the control knob to some extent for increased security of fastening. FIGS. 6 and 7 show in more detail the tubular plastic member 54 with the sleeve 56 fitted thereto and also the operating spindle 48 of the selector switch. As can be seen from FIG. 6, the spindle 48 is of generally semi-circular shape in cross-section and the tubular plastic member includes an integrally moulded plastic segment 58, also of generally semi-circular shape in cross-section which co-operates with spindle 48 to turnably couple the control knob and the operating spindle.

As was explained in connection with the preceding embodiments, reinforcement or repair of the selector switch may be effected using a minimum of simple tools and at minimum cost. In the present embodiment, the only expense in terms of materials is the metal sleeve, the value of which would probably be in the range of $0.05 to $0.10, in comparison with the cost of probably in the range of $0.40 to $0.95 for a new control knob, if available. By the same token, the cost of reinforcing unbroken control knobs by the method of the invention increases the overall cost only very slightly.

Figure 8:
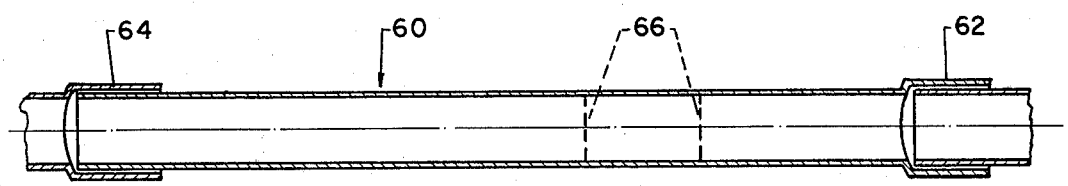
FIG. 8 is a diagrammatic longitudinal sectional view through a conventional plastic downspout.
Figure 9:
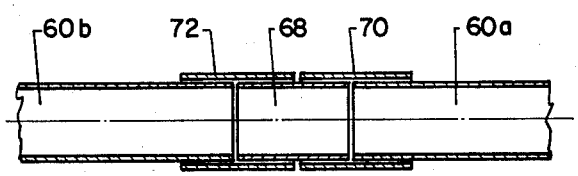
FIG. 9 is a longitudinal sectional view through part of the downspout of FIG. 8 and illustrates how a damaged downspout may be repaired in accordance with the method of the invention; and, FIG. 10 is an enlargement of FIG. 9.
Figure 10:
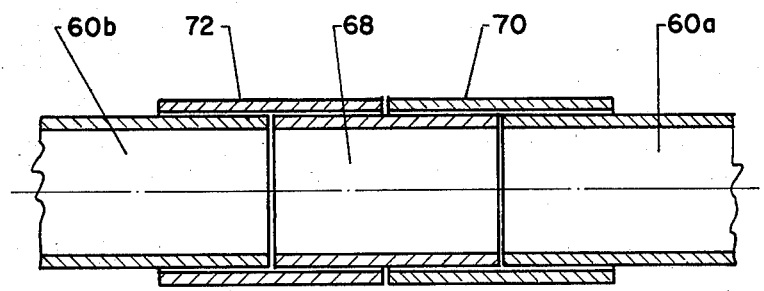

FIGS. 8, 9 and 10 illustrate a further application of the method of the invention in repairing a damaged plastic sewer pipe or downspout. FIG. 8 shows a conventional plastic downspout in the undamaged condition. The downspout is made up of a series of interconnected sections of plastic pipe, one of which is indicated at 60. The pipe is moulded to define a socket 62 at one end and a plain portion 64 at its opposite end. Socket 62 receives the plain end of an adjacent pipe section at one end of section 60, while the plain end portion 64 of section 60 is itself received in a socket portion of a pipe section at the other end of section 60. FIGS. 9 and 10 illustrate how the pipe section 60 may be repaired if damaged.

Assuming that the damaged area is in the part of section 60 between the dotted lines 66 in FIG. 8, the damaged part of the pipe is removed by cutting along line 66 so tht the pipe section 60 is then in two parts. These parts are indicated at 60a and 60b in FIGS. 9 and 10. A new portion of plastic pipe indicated at 68 is then prepared to fit between the part 60a and 60b of section 60. Two metal sleeves 70 and 72 are also prepared and are of a diameter to fit closely over the exterior surface of the parts 60a, 60b and 68. In practice, the sequence of assembly would probably be to slide the sleeve 70 and 72 onto the respective parts 60 and 60b and position them clear of the gap between these parts of the pipe section. The replacement part 68 will then be inserted and the sleeve 70 and 72 will be slid together to the position shown in FIGS. 9 and 10.

With the sleeves 70 and 72 positioned over the gaps between the parts 60a and 60b and the new section 68, the sleeves 70 and 72 are then heated to a temperature sufficient to cause melting of the surfaces of the plastic pipe parts where they contact the sleeves. The sleeves may be retained in position by clamps or other devices such as pliers during the heating operation. In any event, when the required temperature is reached, the metal sleeves and plastic pipe parts are abruptly cooled by water, resulting in firm adherence between the plastic pipe parts and the sleeves.

After the metal sleeves have been applied, they can of course be painted in the same colour as the plastic pipe parts in order to make the repair less noticeable than would otherwise be the case. If the pipe to be repaired is disposed below ground or inside a wall, it is necessary to simply make a small opening in the wall to provide access to the damaged area. For example, the plastic pipe section 60 would be typically between 1.5 and 2.5 meters in length. Prior to the invention, it would have been necessary to make an opening of between 1.8 and 2.8 meters in length to provide access to the entire pipe section 60 and it would then have been necessary to remove and replace the entire section. In contrast, the method of the invention requires that only a small aperture need be made. This minimizes the cost of the repair and also the difficulty and cost of making good after the repair has been effected.

Examples of materials from which the metal sleeves employed in the method of the invention may be made are: aluminum, copper, brass, cast iron (nickelled if necessary) and lead. Examples of plastic materials which can be repaired or reinforced by the method of the invention are: ABS, CADCO, EPDN, FRP, PE, PDFE, PVA.

It should also be noted that while the preceding description refers to specific examples of articles which may be repaired or reinforced using the method of the invention, these examples are not to be considered as limiting. The method of the invention may be used in any situation in which a suitable tubular plastic member requires reinforcement or repair. For example, the invention may be used in spring machines, refill machines, inking machines, clipping and printing machines, hot stamping machines, electronically controlled flame cutting machines and other machines which have plastic housings, pipes, taps, cocks, spigots, valves, float valves, air valves, liquid valves, safety valves, etc. It should also be noted that, while plain metal sleeves may be used in the method of the invention, it may in some situations be preferable to employ a special sleeve having ribs or other formations on the surface which is to contact the plastic material with the object of improving the mechanical connection between the metal and the plastic. In any event, the metal sleeve should in each case be of a size and shape to closely fit the plastic member at the region to be repaired or reinforced so that the resulting joint is as secure as possible.

The cooling step in the method of the invention may be performed in any appropriate fashion. Normally water will be the most convenient cooling medium. In this event, the sleeve and member may be cooled simply by immersion or by spraying water onto the sleeve and member. It is however to be understood that other cooling mediums may be used, for example, air or other gases.

What I claim is:

1. A method of repairing a plastic hose connector including a tubular member having an outer end portion which originally included an outwardly projecting annular lip retaining a captive nut, the method comprising the steps of:

(a) applying to the member under the action of heat, a metal sleeve which is of a shape and size selected to closely fit and make surface-to-surface contact with the tubular plastic member at the region thereof to be repaired, the sleeve having an outer end which includes a lip simulating said lip of the tubular plastic member and retaining a captive nut, the sleeve being heated to a temperature sufficient to cause melting of the surface of the member where it contacts the metal sleeve, and the sleeve being applied to the member in a position such that the lip and nut of the sleeve replace the corresponding original parts of the hose connector; and, (b) abruptly cooling the plastic member and sleeve.

2. A method as claimed in claim 1, wherein step (a) is performed by preheating the metal sleeve and applying it to the tubular plastic member in a hot condition, the temperature to which the sleeve is pre-heated being such that, when the sleeve is fitted to the member the surface of the member melts where it contacts the sleeve.

3. A method as claimed in claim 1, wherein step (a) is performed by fitting the metal sleeve to the member in an unheated condition and subsequently applying heat to the sleeve and thereby also to the member, to a temperature sufficient to cause melting of the surface of the member where it contacts the sleeve.

* * * * *